United States Patent
Yamaguchi

(10) Patent No.: US 10,669,110 B2
(45) Date of Patent: Jun. 2, 2020

(54) SHEET CONVEYANCE APPARATUS

(71) Applicant: CANON KABUSHIKI KAISHA, Tokyo (JP)

(72) Inventor: Hiroki Yamaguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/007,019

(22) Filed: Jun. 13, 2018

(65) Prior Publication Data

US 2018/0290847 A1    Oct. 11, 2018

Related U.S. Application Data

(63) Continuation of application No. 15/196,216, filed on Jun. 29, 2016, now Pat. No. 10,023,411.

(30) Foreign Application Priority Data

Jul. 7, 2015    (JP) .................................. 2015-136302
Jun. 3, 2016    (JP) .................................. 2016-112008

(51) Int. Cl.
*B65H 5/06*        (2006.01)
*B65H 29/14*       (2006.01)
(Continued)

(52) U.S. Cl.
CPC ........... *B65H 5/062* (2013.01); *B65H 29/125* (2013.01); *B65H 29/14* (2013.01);
(Continued)

(58) Field of Classification Search
CPC .................. B65H 5/062; B65H 29/125; B65H 2301/512565; B65H 2404/1431
See application file for complete search history.

(56) References Cited

U.S. PATENT DOCUMENTS

| | | |
|---|---|---|
| 5,793,399 A | 8/1998 | Kawakami et al. |
| 5,867,196 A | 2/1999 | Kiyohara et al. |

(Continued)

FOREIGN PATENT DOCUMENTS

| | | |
|---|---|---|
| CN | 1827506 A | 9/2006 |
| CN | 101445194 A | 6/2009 |

(Continued)

OTHER PUBLICATIONS

European Search Report issued in corresponding European Application No. 16175181.3 dated Dec. 7, 2016.

(Continued)

*Primary Examiner* — Howard J Sanders
(74) *Attorney, Agent, or Firm* — Venable LLP

(57) ABSTRACT

A sheet conveyance apparatus conveying a sheet includes a conveyance roller and first and second rotary members. A first virtual line and a second virtual line cross each other when viewed in the rotation axis direction of the conveyance roller, with the first virtual line passing through the rotation center of a first longitudinal end of the first rotary member and a rotation center of a second longitudinal end of the first rotary member when viewed in the rotation axis direction of the conveyance roller. A second virtual line passes through the rotation center of a third longitudinal end of the second rotary member and the rotation center of a fourth longitudinal end of the second rotary member when viewed in the rotation axis direction of the conveyance roller.

18 Claims, 14 Drawing Sheets

(51) Int. Cl.
*B65H 29/12* (2006.01)
*G03G 15/00* (2006.01)
*G06K 15/12* (2006.01)
*H04N 1/00* (2006.01)
*H04N 1/06* (2006.01)

(52) U.S. Cl.
CPC ..... *G03G 15/6529* (2013.01); *G03G 15/6576* (2013.01); *G06K 15/12* (2013.01); *H04N 1/0057* (2013.01); *H04N 1/06* (2013.01); *B65H 2301/512565* (2013.01); *B65H 2404/1431* (2013.01); *G03G 15/6552* (2013.01); *G03G 2215/00679* (2013.01)

(56) References Cited

U.S. PATENT DOCUMENTS

| | | | |
|---|---|---|---|
| 5,886,729 | A | 3/1999 | Hiramatsu et al. |
| 5,899,451 | A | 5/1999 | Kiyohara et al. |
| 5,992,993 | A | 11/1999 | Kiyohara et al. |
| 6,045,220 | A | 4/2000 | Kiyohara et al. |
| 6,330,419 | B1 | 12/2001 | Sano et al. |
| 7,241,985 | B2 | 7/2007 | Nakamura et al. |
| 7,865,128 | B2 | 1/2011 | Lee |
| 10,053,320 | B2* | 8/2018 | Yamaguchi ............ B65H 5/062 |
| 2004/0135310 | A1* | 7/2004 | Yang ...................... B65H 9/166 271/226 |
| 2008/0310900 | A1 | 12/2008 | Lee |
| 2011/0115148 | A1 | 5/2011 | Nakaishi |
| 2015/0098741 | A1 | 4/2015 | Endo |

FOREIGN PATENT DOCUMENTS

| | | |
|---|---|---|
| JP | 11-311893 A | 11/1999 |
| JP | 2006-232523 A | 9/2006 |
| JP | 2007-145452 A | 6/2007 |
| JP | 2009-057174 A | 3/2009 |
| JP | 2010-195544 A | 9/2010 |
| JP | 2012-126481 A | 7/2012 |

OTHER PUBLICATIONS

Chinese Office Action issued in corresponding Chinese Patent Application No. 201610526000.4 dated Nov. 27, 2017 (with English translation).

Japanese Office Action dated Mar. 17, 2020, in related Japanese Patent Application No. 2016-112008.

* cited by examiner

SHEET CONVEYANCE APPARATUS

This application is a continuation of application Ser. No. 15/196,216, filed Jun. 29, 2016.

BACKGROUND OF THE INVENTION

Field of the Invention

The present invention relates to a sheet conveyance apparatus conveying sheets.

Description of the Related Art

Hitherto, Japanese unexamined patent application publication No. 2007-145452 proposes a sheet conveyance apparatus having a conveyance roller and two driven rollers that contact the conveyance roller, capable of conveying a sheet while straightening the curl of the sheet. The two driven rollers are supported by a single holder such that the rotation axes of the rollers are parallel.

On the other hand, Japanese unexamined patent application publication No. 2010-195544 discloses a configuration where driven rollers are inclined with respect to a conveyance roller so as to prevent semi-melted toner from attaching to the driven rollers and causing image defects, in a case where the sheet conveyance apparatus is arranged close to a fixing unit.

However, if a configuration is adopted to straighten curls and suppressing toner attachment to the driven rollers by inclining a plurality of driven rollers, which are provided in parallel, with respect to the conveyance roller, end portions of the driven rollers may contact the conveyance roller strongly, causing striated damages to the sheets.

SUMMARY OF THE INVENTION

According to a first aspect of the present invention, a sheet conveyance apparatus includes a conveyance roller, a first rotary member configured to be rotated in contact with the conveyance roller, and forming a first nip portion, conveying a sheet in a first conveyance direction, together with the conveyance roller, a rotation axis of the first rotary member being inclined with respect to a rotation axis of the conveyance roller such that a center of one end of the first rotary member is positioned at a different position in the first conveyance direction with respect to a center of the other end of the first rotary member in a view from a rotation axis direction of the conveyance roller, and a second rotary member configured to be rotated in contact with the conveyance roller, and forming a second nip portion, conveying a sheet in a second conveyance direction, together with the conveyance roller, the second rotary member being provided downstream of the first rotary member in a rotation direction of the conveyance roller, a rotation axis of the second rotary member being inclined with respect to the rotation axis of the conveyance roller such that a center of one end of the second rotary member is positioned at a different position in the second conveyance direction with respect to a center of the other end of the second rotary member in a view from the rotation axis direction of the conveyance roller.

According to a second aspect of the present invention, a sheet conveyance apparatus includes a conveyance roller, a first rotary member configured to be rotated in contact with the conveyance roller, and forming a first nip portion, conveying a sheet in a first conveyance direction, together with the conveyance roller, and a second rotary member configured to be rotated in contact with the conveyance roller, and forming a second nip portion, conveying a sheet in a second conveyance direction, together with the conveyance roller, the second rotary member being provided downstream of the first rotary member in a rotation direction of the conveyance roller, wherein a rotation axis of the first rotary member and a rotation axis of the second rotary member are inclined with respect to a rotation axis of the conveyance roller, and in a cross section perpendicular to the rotation axis of the conveyance roller, in a case where two areas divided by a virtual line passing a center of one end of the first rotary member and a center of one end of the second rotary member arranged on a same side as the one end of the first rotary member are referred to as a first area and a second area, a center of the other end of the first rotary member is positioned within the first area, and a center of the other end of the second rotary member is positioned within the second area.

According to a third aspect of the present invention, a sheet conveyance apparatus includes a conveyance roller, a first rotary member configured to be rotated in contact with the conveyance roller, and forming a first nip portion, conveying a sheet in a first conveyance direction, together with the conveyance roller, and a second rotary member configured to be rotated in contact with the conveyance roller, and forming a second nip portion, conveying the sheet in a second conveyance direction, together with the conveyance roller, the second rotary member provided downstream of the first rotary member in a rotation direction of the conveyance roller, wherein a rotation axis of the first rotary member and a rotation axis of the second rotary member are not parallel.

Further features of the present invention will become apparent from the following description of exemplary embodiments with reference to the attached drawings.

DESCRIPTION OF THE EMBODIMENTS

First Embodiment

Figure 1:
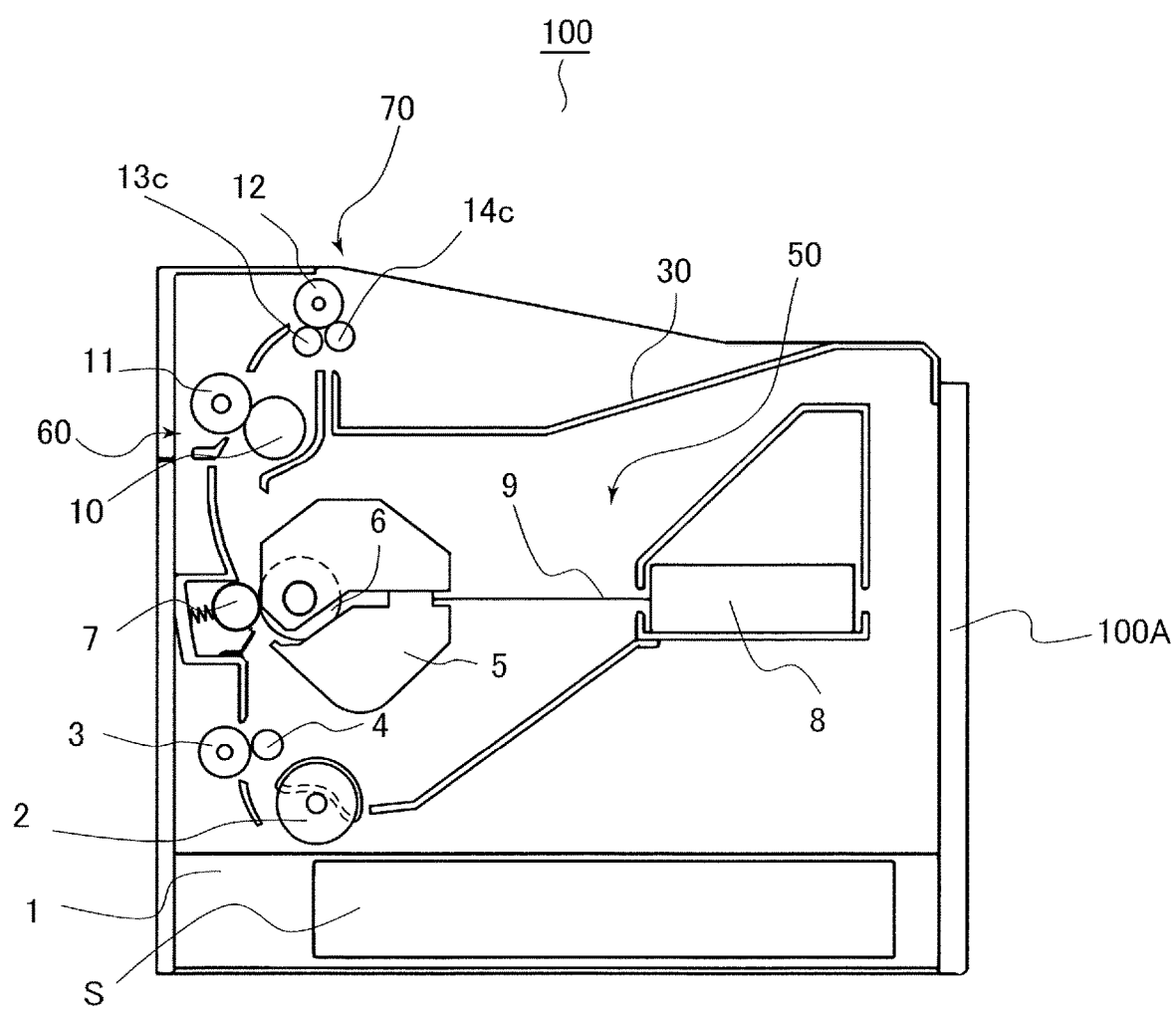
FIG. 1 is a general schematic view of a printer according to a first embodiment.

At first, a first embodiment of the present invention will be described. A printer 100, i.e., image forming apparatus, according to the first embodiment is an electro-photographic laser beam printer. As illustrated in FIG. 1, the printer 100 includes a sheet feeding cassette 1 capable of being inserted to and drawn from a printer main body 100A, an image forming unit 50 forming an image on a sheet fed from the sheet feeding cassette 1, a fixing unit 60, and a sheet discharge portion 70.

When an image forming command is output to the printer 100, an image forming process by the image forming unit 50 is started based on image information entered from an external computer and the like connected to the printer 100. The image forming unit 50 includes a cartridge 5 having a photosensitive drum 6, i.e., an image bearing member, a laser scanner 8, and a transfer roller 7. The laser scanner 8 irradiates a laser beam 9 toward the photosensitive drum 6 based on the entered image information. At this time, the photosensitive drum 6 is charged in advance by a charging roller (not shown), and an electrostatic latent image is formed on the photosensitive drum 6 by irradiating the laser beam 9. Thereafter, an electrostatic latent image is developed by a developing roller (not shown), and a toner image is formed on the photosensitive drum 6.

In parallel with the above-described image forming process, a sheet S supported on the sheet feeding cassette 1 is sent out by a feeding roller 2. The sheet S is separated one by one via a separation unit (not shown). Then, the sheet S is conveyed via an intermediate transfer roller 3 and a conveyance idler roller 4 toward the transfer roller 7. The transfer roller 7, i.e., transfer unit, transfers a toner image formed on the photosensitive drum 6 to the sheet S by having a transfer bias applied thereto.

The sheet S having the toner image transferred from the transfer roller 7 is heated and pressed by the fixing unit 60 composed of a heating roller 10 and a pressure roller 11, and the toner image is fixed. Then, the sheet S is discharged onto a discharge tray 30 by the sheet discharge portion 70 arranged downstream of the fixing unit in a sheet conveyance direction.

Figure 2:
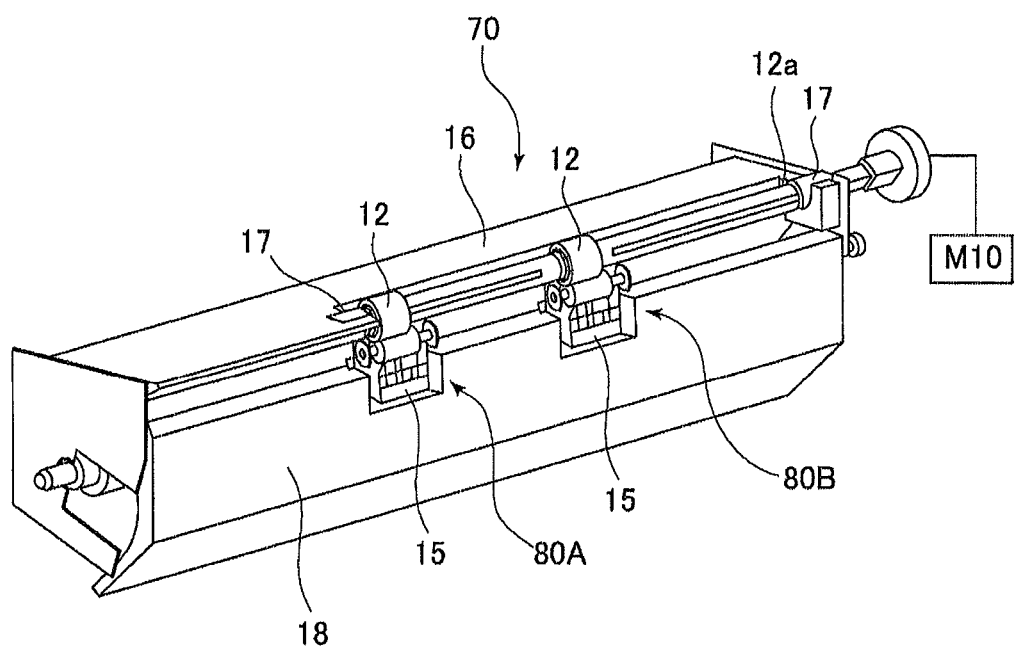
FIG. 2 is a perspective view of a sheet discharge portion according to the first embodiment.

Next, the sheet discharge portion 70 will be described in detail. As illustrated in FIG. 2, the sheet discharge portion 70 includes a discharge upper guide 16 and a discharge lower guide 18 constituting a discharge conveyance path 31 (refer to FIG. 3), and a drive shaft 12a supported rotatably by bearings 17 and 17 press-fit to the discharge upper guide 16. Further, the sheet discharge portion 70 includes a first sheet conveyance unit 80A, i.e., sheet conveyance apparatus, and a second sheet conveyance unit 80B arranged abreast in a width direction orthogonal to the sheet conveyance direction. The first sheet conveyance unit 80A and the second sheet conveyance unit 80B are disposed symmetrically with respect to a center line in the width direction of the discharge conveyance path 31, and in the present embodiment, only the configuration of the first sheet conveyance unit 80A is described, and the configuration of the second sheet conveyance unit 80B will be omitted.

Figure 3:
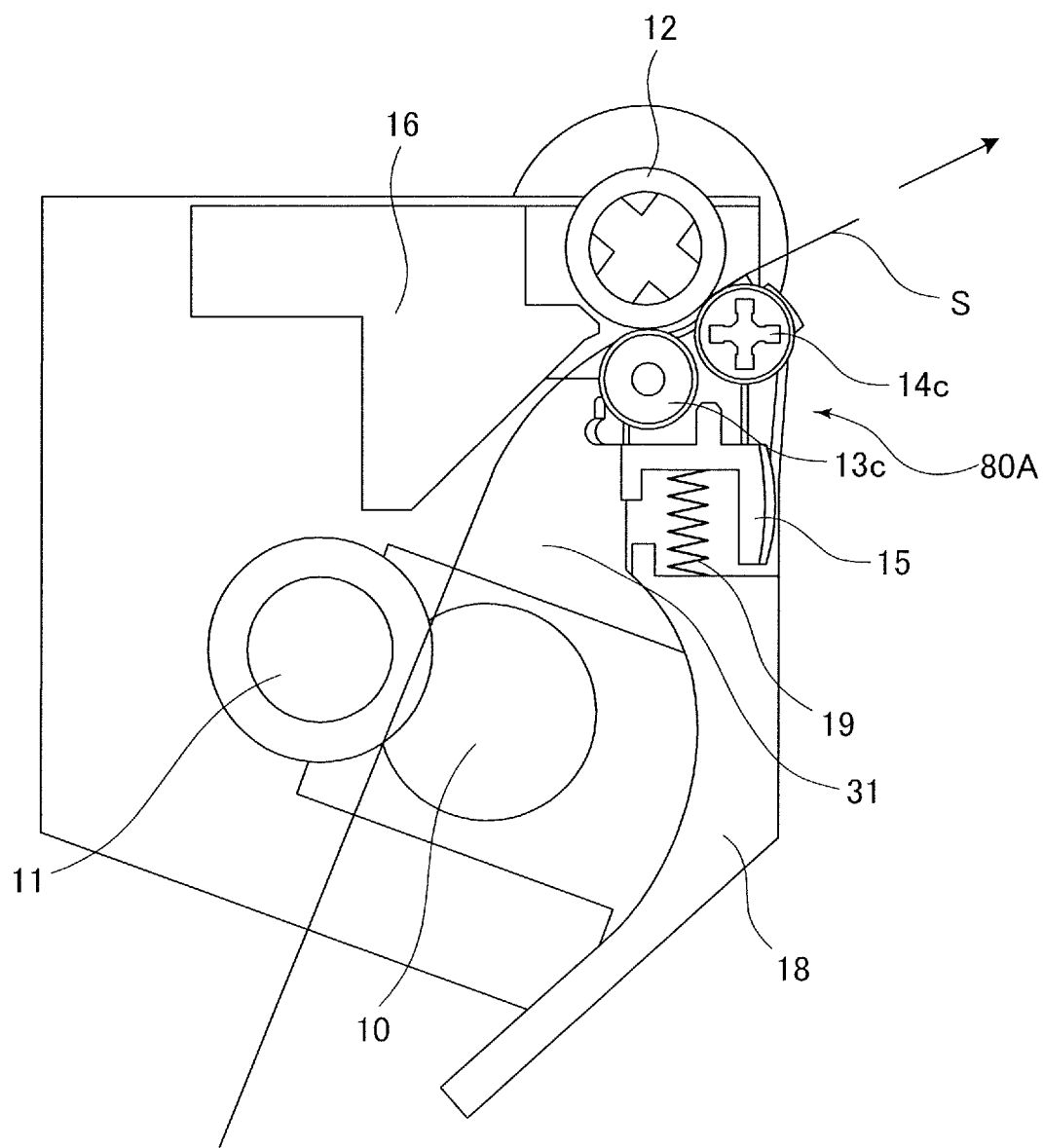
FIG. 3 is a cross-sectional side view of a first sheet conveyance unit according to the first embodiment.
Figure 4:
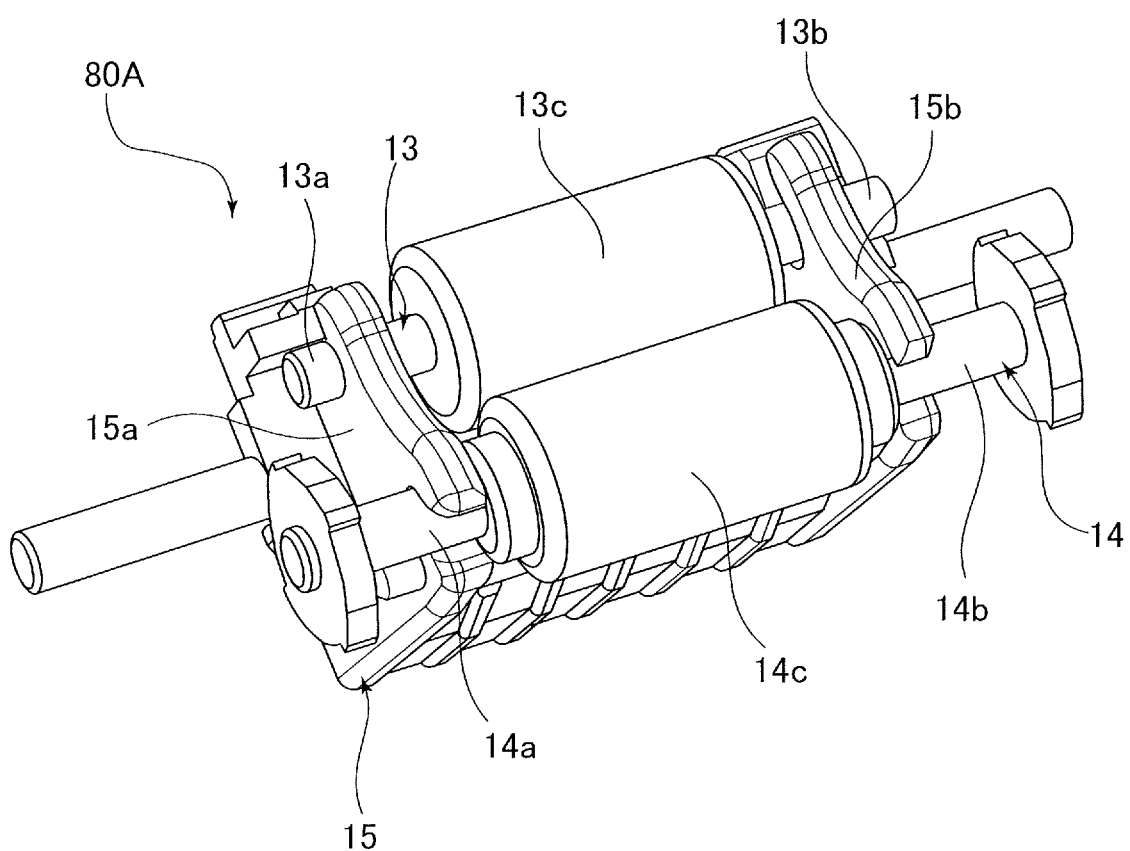
FIG. 4 is a perspective view of the first sheet conveyance unit according to the first embodiment.

As illustrated in FIGS. 3 and 4, the first sheet conveyance unit 80A includes a discharge roller 12, i.e., conveyance roller, fixed to a drive shaft 12a, i.e., rotation shaft, and a first idler roller 13c, i.e., first rotary member, driven by the discharge roller 12. Further, the first sheet conveyance unit 80A includes a second idler roller 14c, i.e., second rotary member, arranged downstream in the sheet conveyance direction of the first idler roller 13c, and driven by the discharge roller 12. The first sheet conveyance unit 80A includes, in a rotation shaft direction of the discharge roller 12, a first rotation shaft 13, i.e., first shaft portion, extending from both ends of the first idler roller 13c, a second rotation shaft 14, i.e., second shaft portion, extending from both ends of the second idler roller 14c, and a holding member 15, i.e., holder, rotatably supporting the first rotation shaft 13 and the second rotation shaft 14.

Figure 12A:
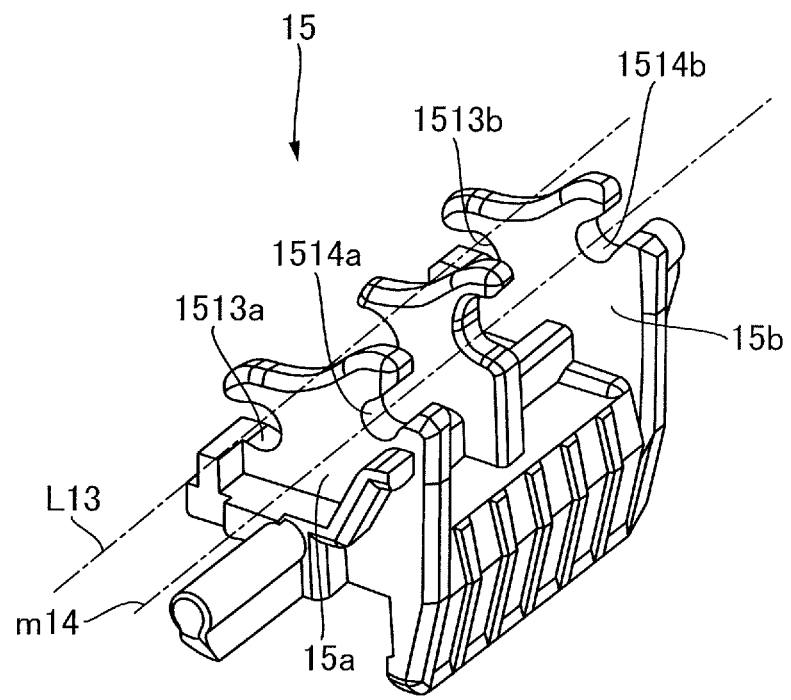
FIG. 12A is a perspective view of a holding member according to the first embodiment.

A perspective view of the holding member 15 illustrated in FIG. 12A is referred to in describing a configuration of the holding member 15. The holding member 15 includes a first side wall 15a, i.e., first supporting portion, and a second side wall 15b, i.e., second supporting portion, disposed in parallel with the first side wall 15a. The first side wall 15a includes supporting portions 1513a and 1514a respectively rotatably supporting one end portion 13a of the first rotation shaft 13 and one end portion 14a of the second rotation shaft 14 arranged on the same side as the one end portion 13a. The second side wall 15b includes supporting portions 1513b and 1514b respectively rotatably supporting the other end portion 13b of the first rotation shaft 13 and the other end portion 14b of the second rotation shaft 14 arranged on the same side as the other end portion 13b. A virtual line L13 passing the supporting portions 1513a and 1513b is not parallel with a virtual line m14 passing a supporting portion 1514a and a supporting portion 1514b.

Figure 12B:
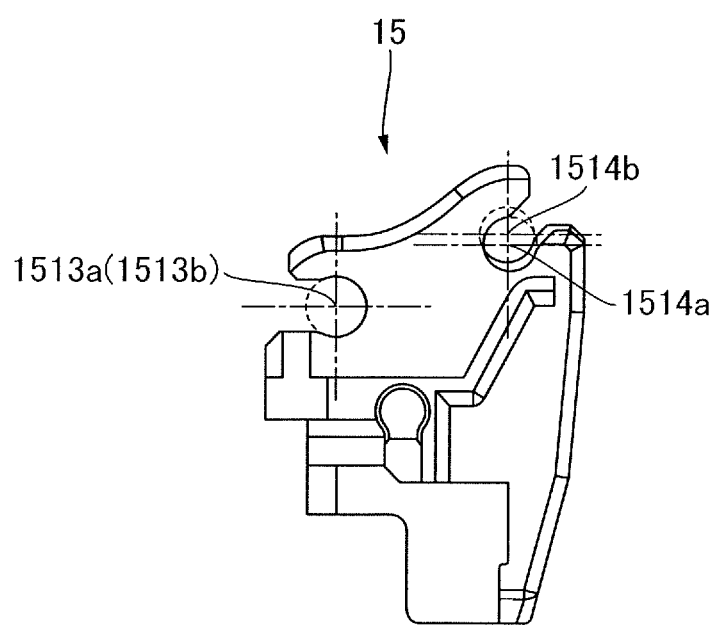
FIG. 12B is a front view of the holding member according to the first embodiment.

FIG. 12B illustrates the holding member 15 viewed from a direction perpendicular to the first side wall 15a. The supporting portions 1513a and 1513b are arranged coaxially, whereas the supporting portions 1514a and 1514b are arranged non-coaxially. In other words, when seen from the direction perpendicular to the first side wall 15a, the supporting portions 1513a and 1513b are arranged at positions where the center portions are mutually overlapped, whereas the supporting portions 1514a and 1514b are arranged at positions where the center portions are not overlapped. The holding member 15 is designed such that the virtual line L13 is inclined with respect to the drive shaft 12a of the discharge roller 12.

The holding member 15 is attached movably in a substantially vertical direction with respect to the discharge lower guide 18, and a spring 19 is arranged in a compressed manner between the discharge lower guide 18 and the holding member 15. The spring 19 biases the first idler roller 13c and the second idler roller 14c via the holding member 15 to be in pressure contact with the discharge roller 12. Further, the spring 19 is arranged such that the first idler roller 13c and the second idler roller 14c press a substantially center position in an axial direction of the discharge roller 12.

A control unit (not shown) is provided in the printer main body 100A, and the drive shaft 12a is rotated by the control unit driving a drive source M10. When the drive shaft 12a rotates, the discharge roller 12 fixed to the drive shaft 12a rotates, and along with the rotation of the discharge roller 12, the first and second idler rollers 13c and 14c are driven to rotate.

Figure 5:
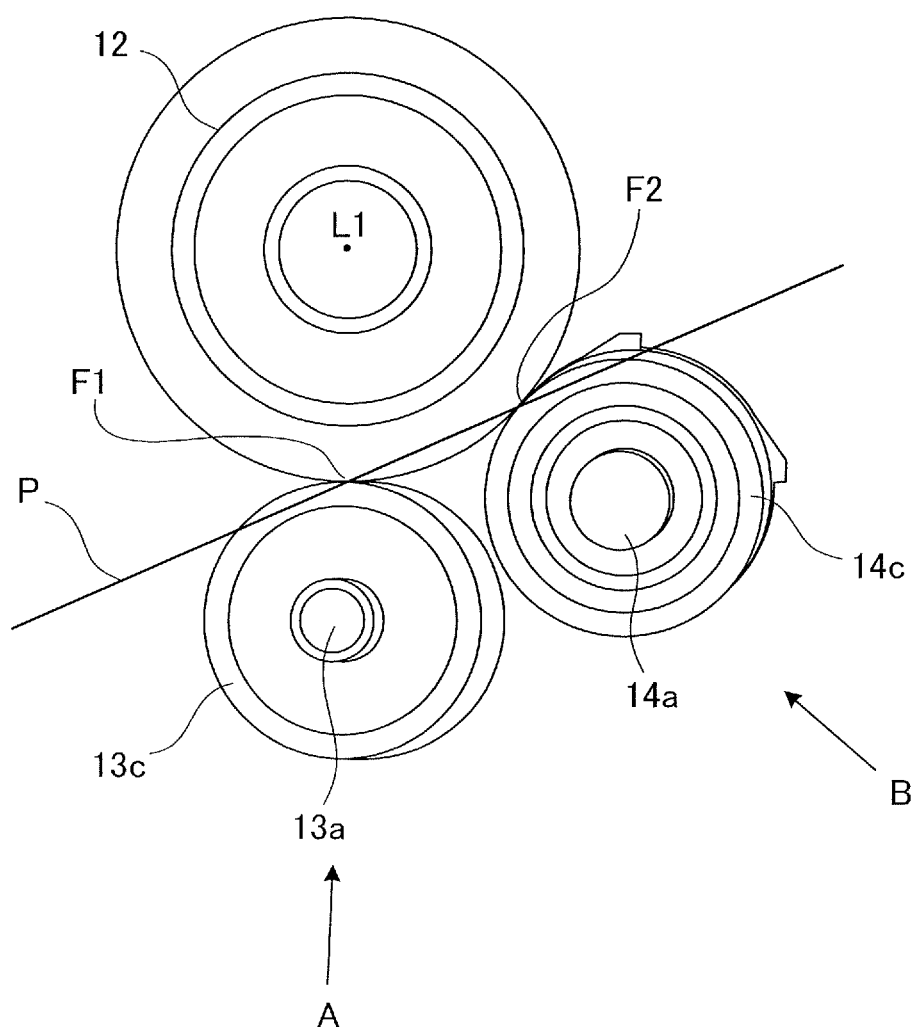
FIG. 5 is a side view illustrating an inclination of a first idler roller and a second idler roller according to the first embodiment.
Figure 6:
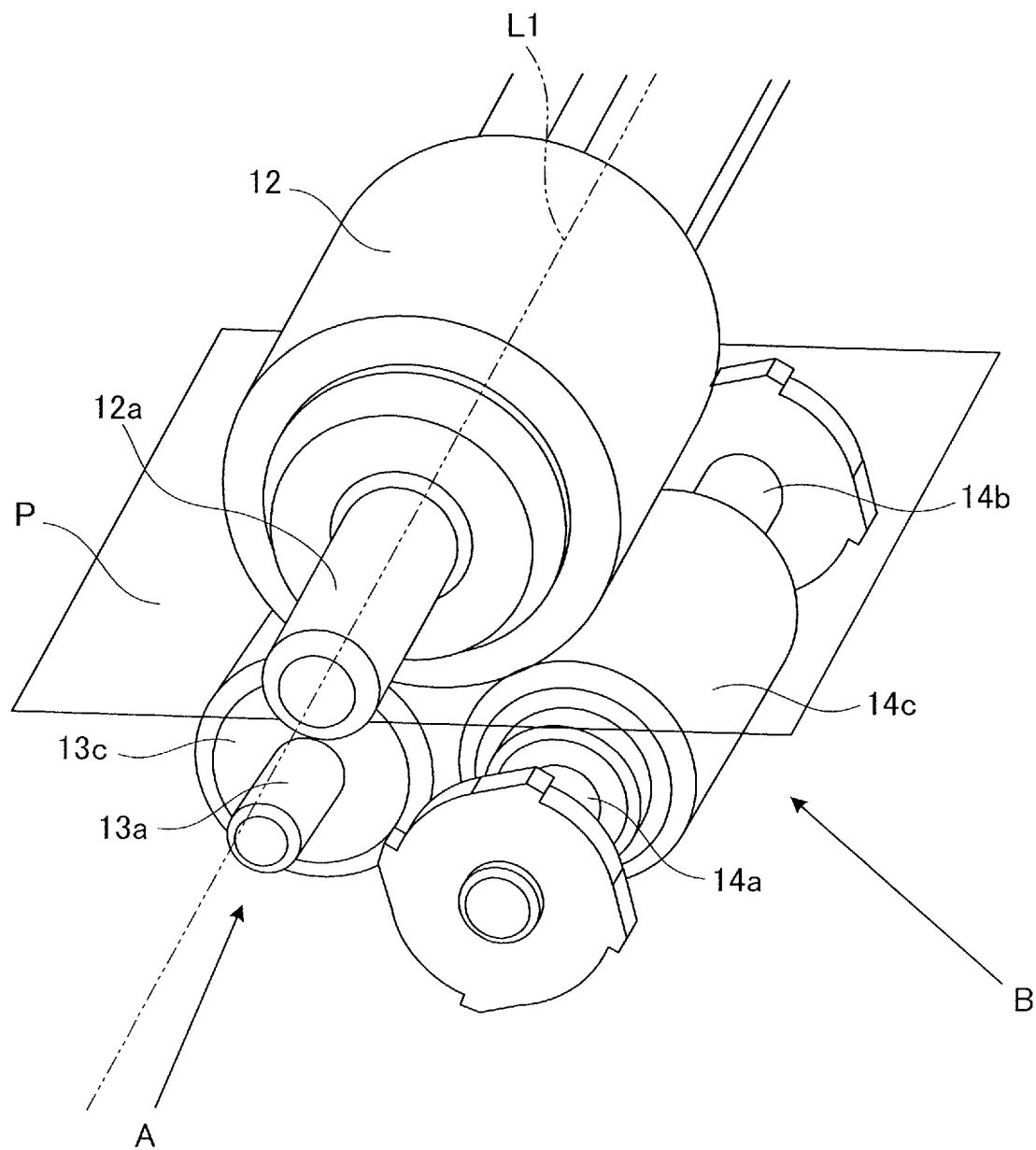
FIG. 6 is a perspective view illustrating the inclination of the first idler roller and the second idler roller according to the first embodiment.
Figure 7:
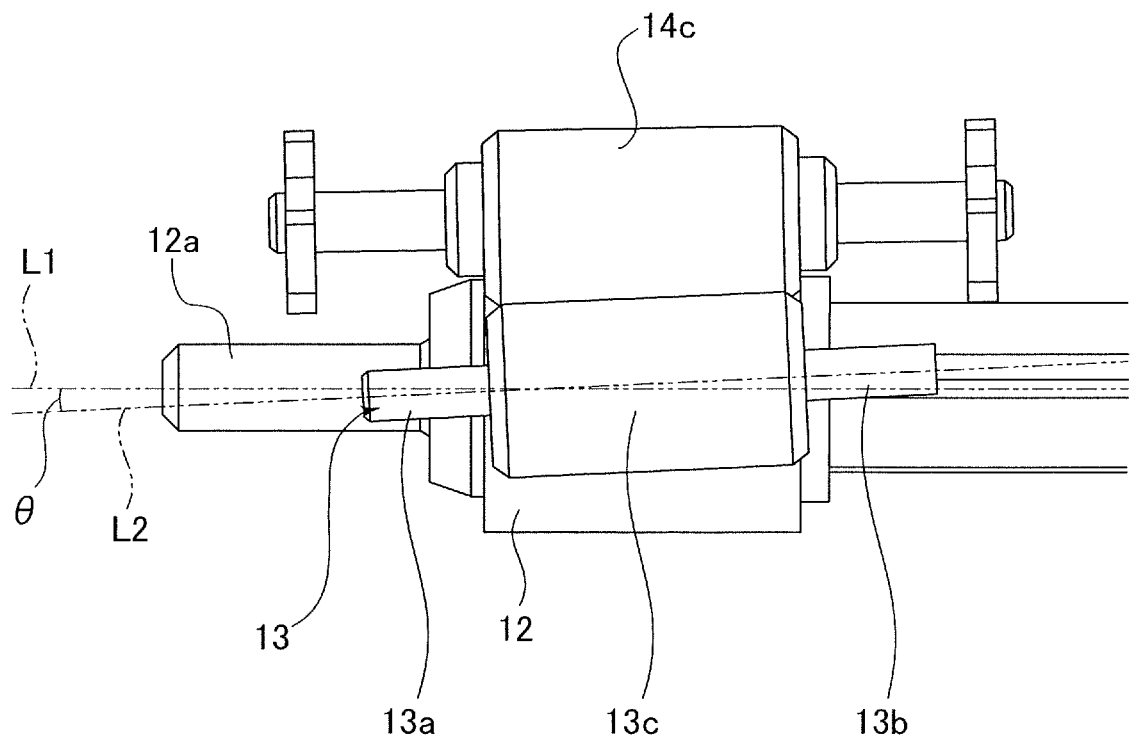
FIG. 7 is a view taken from direction A of FIGS. 5 and 6.
Figure 8:
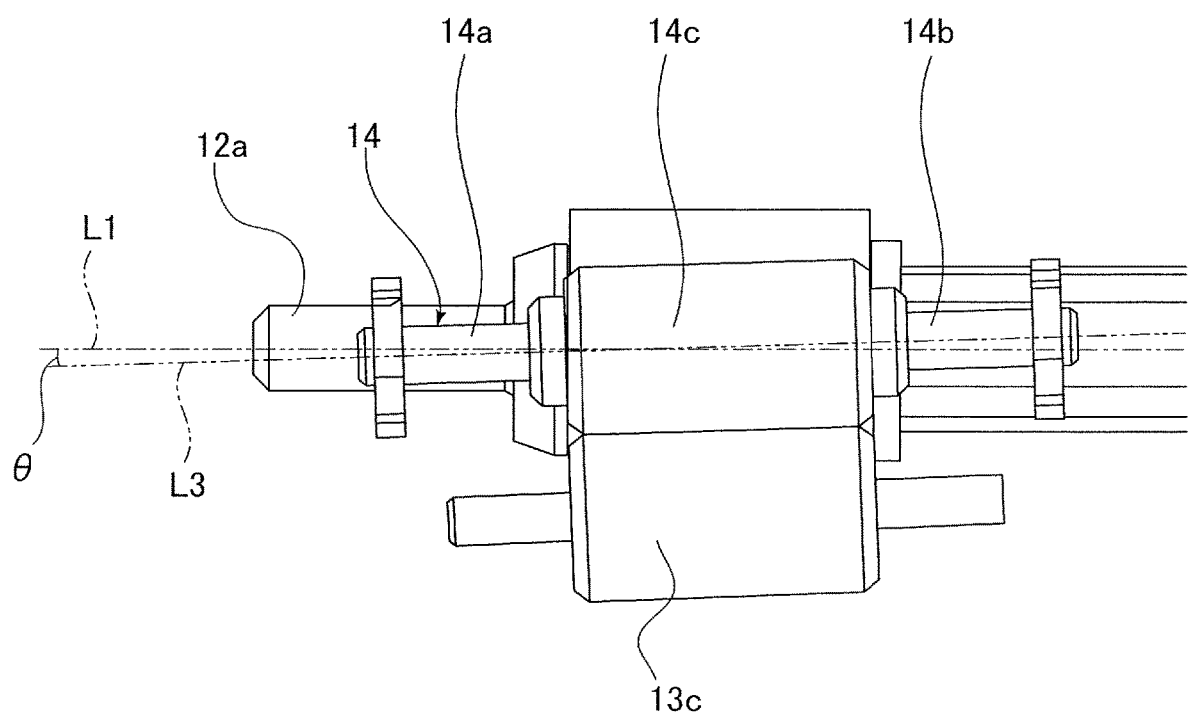
FIG. 8 is a view taken from direction B of FIGS. 5 and 6.

Next, a more detailed arrangement of the first and second idler rollers 13c and 14c will be described with reference to FIGS. 5 through 8. FIG. 5 is a side view of the discharge roller 12, the first idler roller 13c and the second idler roller 14c seen from a rotational axis line L1 of the discharge roller 12. FIG. 7 is a view seen from the direction of arrow A of FIGS. 5 and 6, and FIG. 8 is a view seen from the direction of arrow B of FIGS. 5 and 6. The direction of arrow A is a direction perpendicular to a contact surface F1 between the discharge roller 12 and the first idler roller 13c, and the direction of arrow B is a direction perpendicular to a contact surface F2 between the discharge roller 12 and the second idler roller 14c.

As illustrated in FIG. 7, the first idler roller 13c is arranged such that the first rotation shaft 13 is inclined with respect to the rotational axis line L1 of the discharge roller 12. In other words, a rotational axis line L2 of the first idler roller 13c is inclined for angle θ with respect to the rotational axis line L1 of the discharge roller 12.

Further, as illustrated in FIG. 8, the second idler roller 14c is arranged such that the second rotation shaft 14 is inclined with respect to the rotational axis line L1 of the discharge roller 12 and the first rotation shaft 13. In other words, a rotational axis line L3 of the second idler roller 14c is inclined by angle θ with respect to the rotational axis line L1 of the discharge roller 12. In the present embodiment, the inclination angles of the rotational axis lines L2 and L3 with respect to the rotational axis line L1 are the same angle θ, but the angles can differ as long as the transfer of the sheet S is not hindered. Further, the inclination of the first idler roller 13c and the second idler roller 14c are set in accordance with the positions of the supporting portions 1513a, 1513b, 1514a and 1514b of the holding member 15. The angle θ should preferably be 1 degree or greater and 3 degrees or smaller.

Now, as illustrated in FIGS. 5 and 6, a plane parallel to the rotational axis line L1 of the discharge roller 12 and including the contact surfaces F1 and F2 is defined as a reference plane P. The first idler roller 13c and the second idler roller 14c are arranged to be inclined toward a same direction with respect to a width direction when viewed from a direction orthogonal to the reference plane P. The one end portion 13a positioned upstream in the sheet conveyance direction of the first rotation shaft 13 is arranged closer to the reference plane P than to the other end portion 13b positioned downstream. The one end portion 14a positioned upstream in the sheet conveyance direction of the second rotation shaft 14 is arranged farther from the reference plane P than the other end portion 14b positioned downstream.

As described, according to the present embodiment, the first idler roller 13c and the second idler roller 14c are respectively independently inclined with respect to the discharge roller 12. Thereby, the first idler roller 13c and the second idler roller 14c are in contact at a center position in the width direction with the discharge roller 12. In other words, the first idler roller 13c and the second idler roller 14c contact the discharge roller 12 symmetrically with the center position in the width direction set as reference, such that the sheet S can be conveyed stably. Further, damages such as creases of the sheet can be reduced. Furthermore, the present arrangement prevents toner from attaching to the first and second idler rollers 13c and 14c, and can straighten the curls of the sheet.

Next, how the first idler roller 13c is inclined with respect to the discharge roller 12 and how the second idler roller 14c is inclined with respect to the discharge roller 12 will be described in detail with reference to FIGS. 13A, 13B and 13C.

Figure 13A:
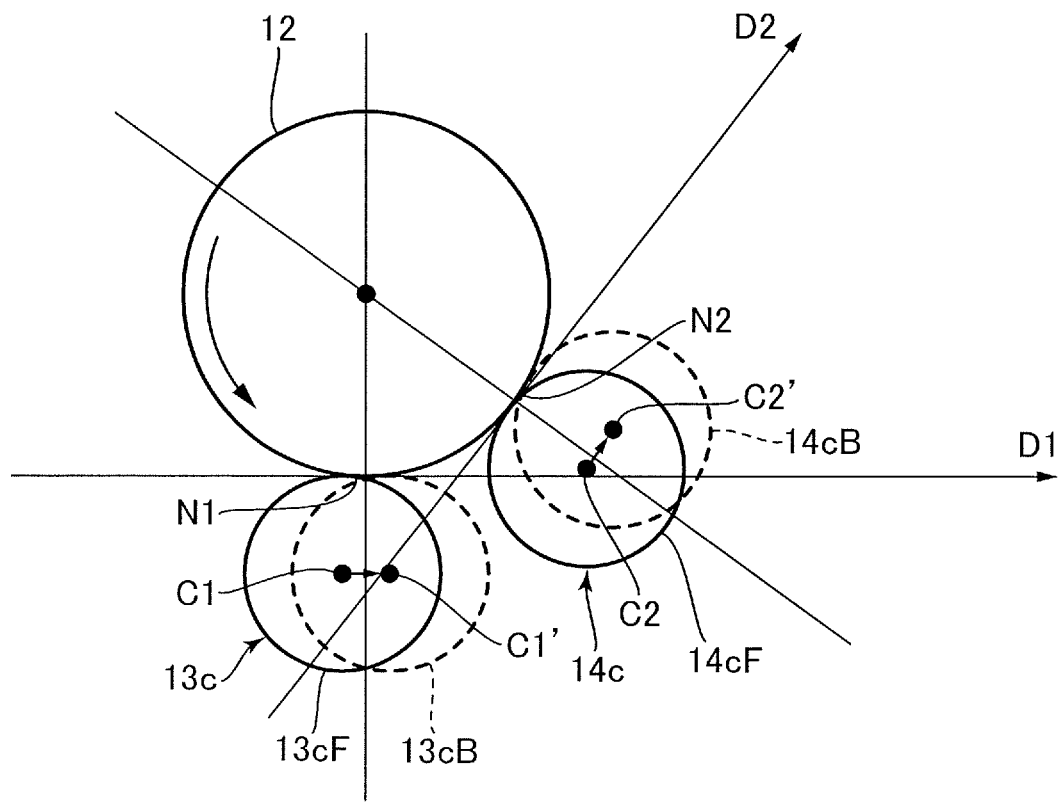
FIG. 13A is an explanatory view of the inclination of a discharge roller, the first idler roller and the second idler roller according to the first embodiment.
Figure 13B:
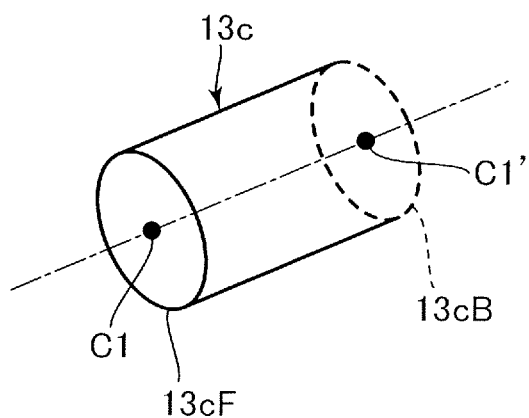
FIG. 13B is a perspective view of the first idler roller.
Figure 13C:
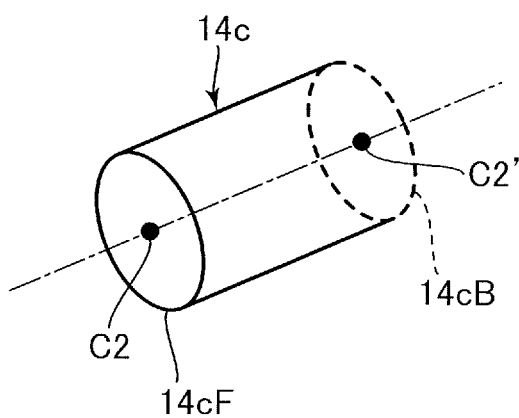
FIG. 13C is a perspective view of the second idler roller.

FIG. 13A is a view illustrating the discharge roller 12, the first idler roller 13c and the second idler roller 14c from the direction of the rotation axis of the discharge roller 12. In FIG. 13A, one end face 13cF, i.e., one end, of the first idler roller 13c is illustrated by a solid line, and the other end face 13cB, i.e., the other end, is illustrated by a dashed line. A center of one end face 13cF of the first idler roller 13c is referred to as C1, and a center of the other end face 13cB is referred to as C1'. A sheet is conveyed by a nip portion N1, i.e., first nip portion, formed by the discharge roller 12 being in contact with the first idler roller 13c. A conveyance direction D1, i.e., first conveyance direction, of a sheet at the nip portion N1 is a direction perpendicular to a line passing a center of the rotation shaft direction of the first idler roller 13c, i.e., center of a line segment connecting C1 and C1', and a center of rotation of the discharge roller 12, when seen from the rotation shaft direction of the discharge roller 12.

Similarly, in the second idler roller 14c, one end face 14cF is illustrated by a solid line, and the other end face 14cB is illustrated by a dashed line. A center of one end face 14cF of the second idler roller 14c is referred to as C2, and a center of the other end face 14cB is referred to as C2'. FIGS. 13B and 13C are perspective views of the first idler roller 13c and the second idler roller 14c. A sheet is conveyed by a nip portion N2, i.e., second nip portion, formed by the discharge roller 12 being in contact with the second idler roller 14c. A conveyance direction D2, i.e., second conveyance direction, of a sheet at the nip portion N2 is a direction perpendicular to a line passing a center of the rotation shaft direction of the second idler roller 14c, i.e., center of a line segment connecting C2 and C2', and a center of rotation of the discharge roller 12, when seen from the rotation shaft direction of the discharge roller 12.

A rotation shaft of the first idler roller 13c is inclined in the following manner with respect to the rotation shaft of the discharge roller 12. When seen from the rotation shaft direction of the discharge roller 12, the center C1' of the other end face 13cB of the rotation shaft direction of the first idler roller 13c is shifted downstream with respect to the center C1 of one end face 13cF of the sheet conveyance direction D1 of the nip portion N1. The rotation shaft of the second idler roller 14c is inclined in the following manner with respect to the rotation shaft of the discharge roller 12. When seen from the rotation shaft direction of the discharge roller 12, the center C2' of the other end face 14cB of the rotation shaft direction of the second idler roller 14c is shifted downstream with respect to the center C2 of the one end face 14cF of the sheet conveyance direction D2 of the nip portion N2.

How the first idler roller 13c and the second idler roller 14c are inclined with respect to the discharge roller 12 will be described with reference to FIGS. 14A, 14B and 14C.

Figure 14A:
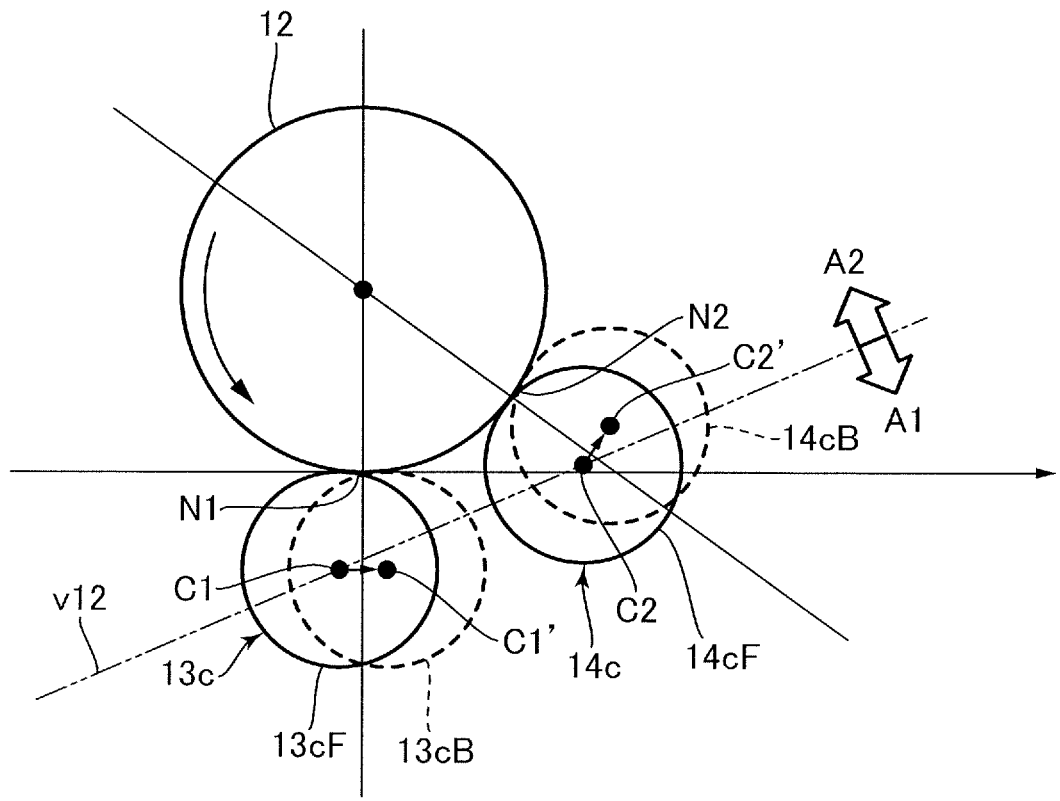
FIG. 14A is a view illustrating the inclination of a discharge roller, the first idler roller and the second idler roller according to the second embodiment.
Figure 14B:
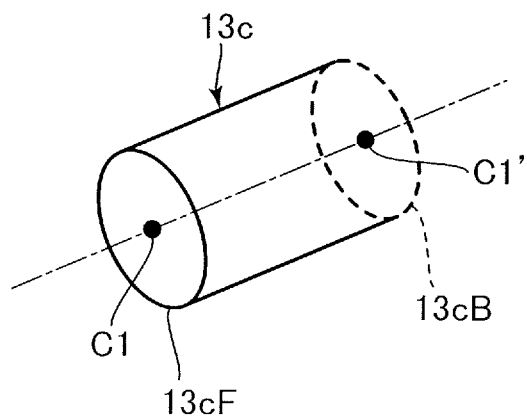
FIG. 14B is a perspective view of the first idler roller.
Figure 14C:
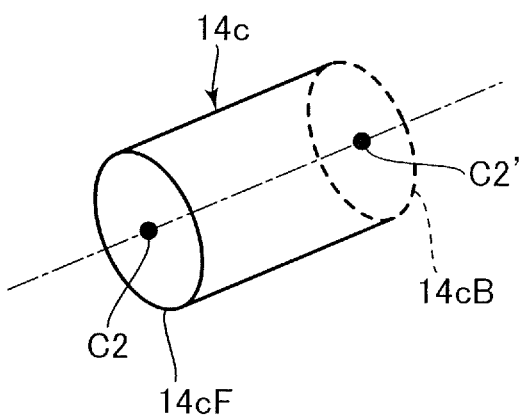
FIG. 14C is a perspective view of the second idler roller.

FIG. 14A is a view illustrating the discharge roller 12, the first idler roller 13c and the second idler roller 14c from the rotation shaft direction of the discharge roller 12. In FIG. 14A, one end face 13cF of the first idler roller 13c is illustrated by a solid line, and the other end face 13cB is illustrated by a dashed line. The center of one end face 13cF of the first idler roller 13c is referred to as C1, and the center of the other end face 13cB is referred to as C1'.

Similarly, regarding the second idler roller 14c, one end face 14cF is illustrated by a solid line, and the other end face 14cB is illustrated by a dashed line. The center of one end face 14cF of the second idler roller 14c is referred to as C2, and the center of the other end face 14cB is referred to as C2'. FIGS. 14B and 14C are perspective views of the first idler roller 13c and the second idler roller 14c. The center C1 of the one end face 13cF of the first idler roller 13c and the center C2 of the one end face 14cF of the second idler roller 14c are arranged on the same side in the rotation shaft direction of the discharge roller 12.

Now, in a cross section perpendicular to the rotation shaft of the discharge roller 12, areas divided by a virtual line v12 passing the centers C1 and C2 are referred to as a first area A1 and a second area A2. The first idler roller 13c and the second idler roller 14c are respectively inclined with respect to the discharge roller 12 such that the center C1' of the other end face 13cB of the first idler roller 13c is positioned within the first area A1 and the center C2' of the other end face 14cB of the second idler roller 14c is positioned within the second area A2.

According further to the present embodiment, as described above, the first and second sheet conveyance units 80A and 80B are arranged symmetrically with respect to a center line, i.e., a center portion of the discharge roller 12 in the rotation axis direction thereof, in the width direction of the discharge conveyance path 31. The conveyance directions of the first and second idler rollers 13c and 14c of the first and second sheet conveyance units 80A and 80B are respectively directed outward by predetermined angles with respect to the sheet conveyance direction. In other words, the sheet S will be pulled outward in the width direction while the sheet S is being conveyed by the sheet discharge portion 70, so that skew feeding and forming of creases on the sheet S can be prevented.

In the present embodiment, the sheet discharge portion 70 has a pair of sheet conveyance units 80A and 80B, but the present invention is not restricted to this configuration, and two or more pairs of sheet conveyance units arranged in parallel in the width direction can also be adopted.

Second Embodiment

Figure 9:
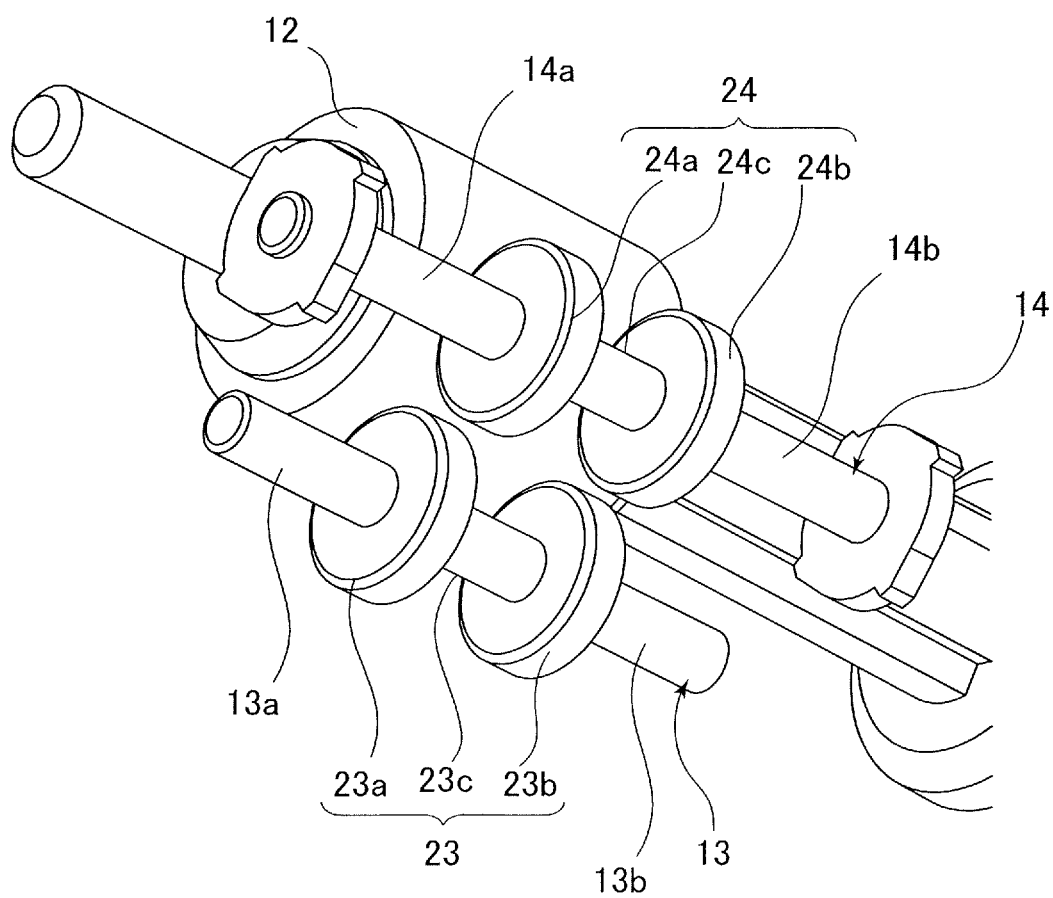
FIG. 9 is a perspective view of a first idler roller and a second idler roller according to the second embodiment.

Next, a second embodiment of the present invention will be described with reference to FIG. 9. The second embodiment has changed the configuration of the first and second idler rollers 13c and 14c of the first embodiment, and the configurations similar to the first embodiment are either not illustrated or assigned with the same reference numbers.

A first idler roller 23 according to the present embodiment includes a disk-shaped first disk portion 23a and second disk portion 23b arranged in parallel in the axial direction, and the first and second disk portions 23a and 23b are fixed to the first rotation shaft 13. A second idler roller 24 includes a disk-shaped third disk portion 24a and fourth disk portion 24b arranged in parallel in the shaft direction, and the third and fourth disk portions 24a and 24b are fixed to the second rotation shaft 14.

The first and second disk portions 23a and 23b are arranged symmetrically with respect to a center position in the width direction of the discharge roller 12. The third and fourth disk portions 24a and 24b are arranged symmetrically with respect to a center portion in the width direction of the discharge roller 12. That is, concave portions 23c and 24c not in contact with the discharge roller 12, i.e., first and second concave portions, are respectively formed in center portions between the first and second disk portions 23a and 23b and between the third and fourth disk portions 24a and 24b. The inclination of the first rotation shaft 13 and the second rotation shaft 14 with respect to the rotational axis line L1 of the discharge roller 12 is set similarly as the first embodiment.

Therefore, the first and second disk portions 23a and 23b contact the discharge roller 12 symmetrically with respect to the center position in the width direction of the roller 12. Further, the third and fourth disk portions 24a and 24b contact the discharge roller 12 symmetrically with respect to the center position in the width direction of the roller 12. Thereby, the discharge roller 12, the first idler roller 23 and the second idler roller 24 can convey the sheet S stably and more smoothly, and damages such as creases on the sheet can be reduced.

In the present embodiment, both the first and second idler rollers 23 and 24 have two disk portions, but it is possible to adopt a configuration where only one of the idler rollers 23 or 24 has two disk portions, or where three or more disk portions are formed.

Third Embodiment

Figure 10:
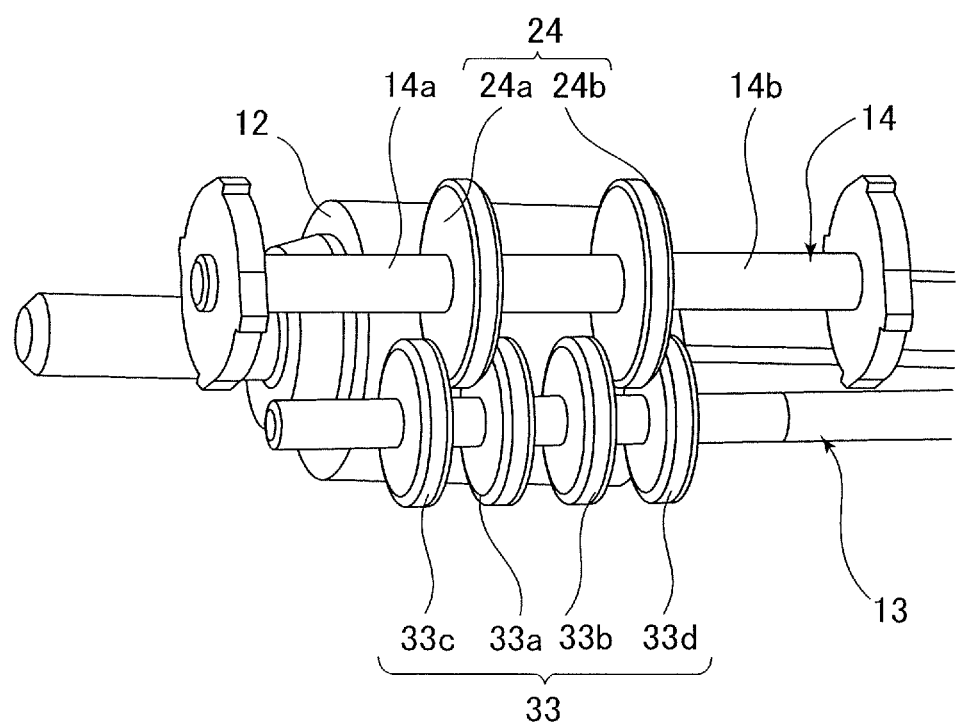
FIG. 10 is a perspective view of a first idler roller and a second idler roller according to a third embodiment.

Next, a third embodiment of the present invention will be described with reference to FIG. 10. The third embodiment has changed the configuration of the first and second idler rollers 13c and 14c of the first embodiment, and similar configurations as the first or second embodiment will either be not shown or denoted with the same reference numbers. The effects similar to the second embodiment will not be described.

A first idler roller 33 according to the present embodiment has disk-shaped first disk portion 33a, second disk portion 33b, fifth disk portion 33c and sixth disk portion 33d that are arranged in parallel in the axial direction. The first and second disk portions 33a and 33b are arranged symmetrically with respect to a center position in the width direction of the discharge roller 12. The fifth and sixth disk portions 33c and 33d are arranged symmetrically with respect to a center position in the width direction of the discharge roller 12. The inclination of the first rotation shaft 13 and the second rotation shaft 14 with respect to a rotational axis line L1 of the discharge roller 12 is set similarly as the first embodiment.

The third and fourth disk portions 24a and 24b constituting the second idler roller 24 are arranged in dislocated positions in the axial direction with respect to the first disk portion 33a, the second disk portion 33b, the fifth disk portion 33c and the sixth disk portion 33d. Further, the third and fourth disk portions 24a and 24b are overlapped in a radial direction with respect to the first disk portion 33a, the second disk portion 33b, the fifth disk portion 33c and the sixth disk portion 33d. More specifically, the third disk portion 24a is arranged to be inserted between the first disk portion 33a and the fifth disk portion 33c, and the fourth disk portion 24b is arranged to be inserted between the second disk portion 33b and the sixth disk portion 33d.

According to this arrangement, the outer diameters of the first disk portion 33a, the second disk portion 33b, the third disk portion 24a, the fourth disk portion 24b, the fifth disk portion 33c and the sixth disk portion 33d can be increased. Thereby, the leading edge of the sheet S can enter the disk portions at a shallow angle, so that the occurrence of sheet jam or damages to the leading edge of the sheet can be reduced.

The present embodiment adopts a configuration where the first idler roller 33 includes four disk portions and the second idler roller 24 includes two disk portions, but the number of disk portions can be set to any arbitrary number.

Fourth Embodiment

Figure 11:
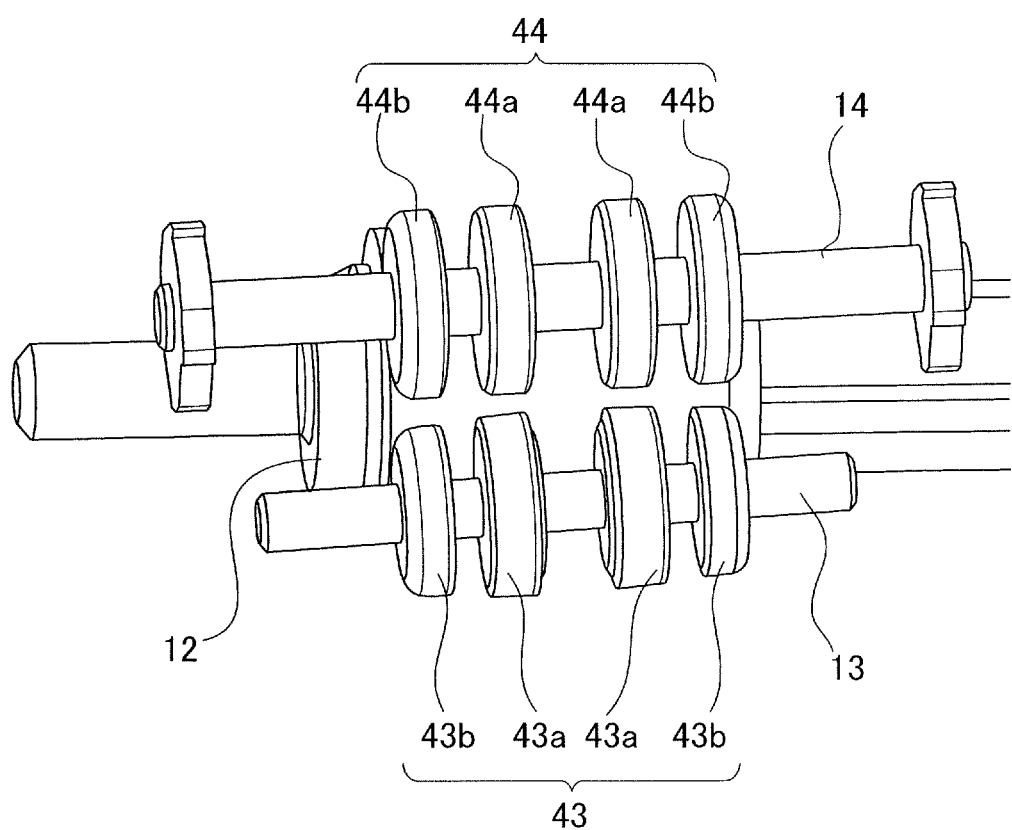
FIG. 11 is a perspective view of a first idler roller and a second idler roller according to a fourth embodiment.

Next, a fourth embodiment of the present invention will be described with reference to FIG. 11. The fourth embodiment has changed the configuration of the first and second idler rollers 13c and 14c of the first embodiment, and similar configurations as the first embodiment are either not illustrated or referred to by the same reference numbers. Further, the similar effects as the second or third embodiments will not be described.

A first idler roller 43 according to the present embodiment includes two center disk portions 43a and 43a disposed at a center portion in a width direction, and two end disk portions 43b and 43b disposed at both end portions in the width direction. The end disk portions 43b and 43b are set to have smaller outer diameters than the center disk portions 43a and 43a, and the first idler roller 43 is designed to be barrel-shaped as a whole.

Moreover, the second idler roller 44 has two center disk portions 44a and 44a provided at a center portion in the width direction and two end disk portions 44b and 44b provided at both end portions in the width direction. The end disk portions 44b and 44b are designed to have smaller outer diameters than the center disk portions 44a and 44a, and as a whole, the second idler roller 44 is barrel-shaped. The inclination of the first rotation shaft 13 and the second rotation shaft 14 with respect to the rotational axis line of the discharge roller 12 is set similarly as the first embodiment.

According to the present embodiment, the first idler roller 43 is barrel-shaped as a whole, so that the sheet S expanded between the fixing unit 60 and the sheet discharge portion 70 can be prevented from being in contact locally with the end portion of the first idler roller 43. That is, since the first idler roller 43 is arranged in an inclined manner with respect to the discharge roller 12, the first idler roller 43 contacts the sheet with stronger force at the upstream side in the sheet conveyance direction than the downstream side of the roller 43. However, since the end disk portions 44b and 44b are set to have smaller outer diameters than the center disk portions 44a and 44a according to the present embodiment, the sheet can be prevented from being damaged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-136302, filed Jul. 7, 2015, and Japanese Patent Application No. 2016-112008, filed Jun. 3, 2016, which are hereby incorporated by reference herein in their entirety.

What is claimed is:

1. A sheet conveyance apparatus conveying a sheet, the sheet conveyance apparatus comprising:
a conveyance roller; and
a rotary member configured to be rotated by a rotation of the conveyance roller, and form a nip portion, together with the conveyance roller, in which the sheet is conveyed in a conveyance direction, a rotation axis of the rotary member being inclined with respect to a rotation axis of the conveyance roller such that when viewed in a rotation axis direction of the conveyance roller, a rotation center of a first longitudinal end of the rotary member is arranged in the conveyance direction at a position different from a position at which a rotation center of a second longitudinal end of the rotary member is arranged,
wherein the rotary member comprises a first contacting member configured to contact the sheet, and a second contacting member closer to a center of the rotary member in a rotation axis direction of the rotary member than the first contacting member and configured to contact the sheet, the second contacting member being independent from the first contacting member, and
wherein a diameter of the first contacting member is smaller than a diameter of the second contacting member.

2. The sheet conveyance apparatus according to claim 1, further comprising a holder holding the rotary member in a rotatable manner such that the rotation axis of the rotary member and the rotation axis of the conveyance roller are not parallel.

3. The sheet conveyance apparatus according to claim 1, wherein an angle formed between the rotation axis of the conveyance roller and the rotation axis of the rotary member is one degree or greater and three degrees or less.

4. The sheet conveyance apparatus according to claim 1, wherein the rotary member is inclined around a center portion of the conveyance roller in the rotation axis direction thereof.

5. A sheet conveyance apparatus conveying a sheet, the sheet conveyance apparatus comprising:
a conveyance roller; and
a rotary member configured to be rotated by a rotation of the conveyance roller, and form a nip portion, together with the conveyance roller, a rotation axis of the rotary member being inclined with respect to a rotation axis of the conveyance roller,
wherein the rotary member includes a shaft portion, a first opposing member configured opposite to the conveyance roller, and a second opposing member closer to a center of the rotary member in a rotation axis direction of the rotary member than the first opposing member and configured opposite to the conveyance roller, the second opposing member being independent from the first opposing member,
wherein a diameter of the shaft portion is smaller than a diameter of the first opposing member, and
wherein a diameter of the first opposing member is smaller than a diameter of the second opposing member.

6. The sheet conveyance apparatus according to claim 5, further comprising a holder holding the shaft portion of the rotary member in a rotatable manner such that the rotation axis of the rotary member and the rotation axis of the conveyance roller are not parallel.

7. The sheet conveyance apparatus according to claim 5, wherein an angle formed between the rotation axis of the conveyance roller and the rotation axis of the rotary member is one degree or greater and three degrees or less.

8. The sheet conveyance apparatus according to claim 5, wherein the rotary member is inclined around a center portion of the conveyance roller in the rotation axis direction thereof.

9. The sheet conveyance apparatus according to claim 5, wherein the rotary member includes a third opposing member disposed on an opposite side of the first opposing member across the second opposing member in the rotation axis direction of the rotary member and configured opposite to the conveyance roller.

10. The sheet conveyance apparatus according to claim 9, the third opposing member is independent from the second opposing member.

11. The sheet conveyance apparatus according to claim 5, wherein the conveyance roller includes a drive shaft configured to drive by a driving force transmitted from a driving source.

12. An image forming apparatus comprising:
an image forming unit configured to form a toner image on a sheet;
a fixing unit configured to fix the toner image on the sheet; and
a sheet conveyance unit configured to convey the sheet through the fixing unit,
wherein the sheet conveyance unit comprises:
a conveyance roller; and
a rotary member configured to be rotated by a rotation of the conveyance roller, and form a nip portion, together with the conveyance roller, a rotation axis of the rotary member being inclined with respect to a rotation axis of the conveyance roller,
wherein the rotary member includes a shaft portion, a first opposing member configured opposite to the conveyance roller, and a second opposing member closer to a center of the rotary member in a rotation axis direction of the rotary member than the first opposing member and configured opposite to the conveyance roller, the second opposing member being independent from the first opposing member,
wherein a diameter of the shaft portion is smaller than a diameter of the first opposing member, and
wherein a diameter of the first opposing member is smaller than a diameter of the second opposing member.

13. The image forming apparatus according to claim 12, further comprising a holder holding the shaft portion of the rotary member in a rotatable manner such that the rotation axis of the rotary member and the rotation axis of the conveyance roller are not parallel.

14. The image forming apparatus according to claim 12, wherein an angle formed between the rotation axis of the conveyance roller and the rotation axis of the rotary member is one degree or greater and three degrees or less.

15. The image forming apparatus according to claim 12, wherein the rotary member is inclined around a center portion of the conveyance roller in the rotation axis direction thereof.

16. The image forming apparatus according to claim 12, wherein the rotary member includes a third opposing member disposed on an opposite side of the first opposing member across the second opposing member in the rotation axis direction of the rotary member and configured opposite to the conveyance roller.

17. The image forming apparatus according to claim 16, wherein the third opposing member is independent from the second opposing member.

18. The image forming apparatus according to claim 12, wherein the conveyance roller includes a drive shaft configured to drive by a driving force transmitted from a driving source.

* * * * *